United States Patent
Ide et al.

(10) Patent No.: US 9,430,649 B2
(45) Date of Patent: Aug. 30, 2016

(54) AUTOMATIC STRONG IDENTITY GENERATION FOR CLUSTER NODES

(71) Applicant: Microsoft Corporation, Redmond, WA (US)

(72) Inventors: Nathan J. Ide, Bothell, WA (US); Magnus Nystrom, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/109,841

(22) Filed: Dec. 17, 2013

(65) Prior Publication Data

US 2015/0169875 A1 Jun. 18, 2015

(51) Int. Cl.
| | |
|---|---|
| *H04L 29/06* | (2006.01) |
| *G06F 21/57* | (2013.01) |
| *G06F 9/445* | (2006.01) |
| *G06F 21/44* | (2013.01) |

(52) U.S. Cl.
CPC .............. *G06F 21/575* (2013.01); *G06F 8/63* (2013.01); *G06F 21/44* (2013.01)

(58) Field of Classification Search
CPC .................................................... H04L 63/104
See application file for complete search history.

(56) References Cited

U.S. PATENT DOCUMENTS

| | | | | |
|---|---|---|---|---|
| 6,751,729 | B1 * | 6/2004 | Giniger | H04L 63/0272 713/153 |
| 6,816,900 | B1 * | 11/2004 | Vogel | H04L 9/3236 709/203 |
| 7,721,282 | B1 * | 5/2010 | Kulkarni | G06F 9/4416 709/203 |
| 2007/0113096 | A1 * | 5/2007 | Zhu | H04L 63/0407 713/180 |
| 2009/0164782 | A1 | 6/2009 | Pourzandi et al. | |
| 2009/0257595 | A1 * | 10/2009 | de Cesare | G06F 21/575 380/277 |
| 2011/0061045 | A1 | 3/2011 | Phillips | |
| 2011/0087882 | A1 * | 4/2011 | Kuo | G06F 21/57 713/156 |
| 2012/0233463 | A1 | 9/2012 | Holt et al. | |

OTHER PUBLICATIONS

International Search Report and Written Opinion regarding PCT Application No. PCT/US2014/069635, Mailed on: Mar. 5, 2015, 9 Pages.

Chris, "Certificate Authority (CA) with OpenSSL", Available at: <<https://www.debian-administration.org/article/618/Certificate-Authority-CA_with_OpenSSL>>, Published on: Oct. 13, 2008, 12 pages.

(Continued)

*Primary Examiner* — Jason K Gee
(74) *Attorney, Agent, or Firm* — Timothy Churna; Daniel Choi; Micky Minhas

(57) ABSTRACT

Aspects of the subject matter described herein relate to clusters. In aspects, an image is created to install software onto nodes of the cluster. A root secret of the cluster is injected into the image. After installing the software of the image onto a node of the cluster, the node may boot into a secure mode, detect that individualization is needed for the node to join a cluster, create an identity for authenticating with other nodes of the cluster, chain the identity via the root secret, and then securely erase the root secret from the node prior to assuming node duties. Among other things, this allows a single image to be used for installing software on all nodes of a cluster without the compromise of a single node compromising the entire cluster.

20 Claims, 5 Drawing Sheets

(56) References Cited

OTHER PUBLICATIONS

"Lamport Signature"—Wikipedia, the Free Encyclopedia, Available at: <<http://en.wikipedia.org/w/index.php?title=Lamport_signature&oldid=583641230>>, Published on: Nov. 28, 2013, 5 pages.
"Red Hat Enterprise Linux 6.2 OpenSSL Module v2.1 FIPS 140-2 Security Policy Contents", Available at: <<http://csrc.nist.gov/groups/STM/cmvp/documents/140-1/140sp/140sp1758.pdf>>,Published on: Oct. 16, 2012, 25 pages.
"HowTos/Xen/InstallingCentOSDomU—CentOS Wiki", Available at: <<https://web.archive.org/web/20120615011702/http:/wiki.centos.org/HowTos/Xen/InstallingCentOSDomU>>, Published on: Jun. 15, 2012, 5 pages.
Pourzandi, et al., "Clusters and Security: Distributed Security for Distributed Systems", Retrieved at <<http://ieeexplore.ieee.org/stamp/stamp.jsp?tp=&arnumber=1558540>>, 2005 IEEE International Symposium on Cluster Computing and the Grid, vol. 1, May 9, 2005, pp. 96-104.
Ionkov, et al., "XCPU2 Distributed Seamless Desktop Extension", Retrieved at <<http://ieeexplore.ieee.org/stamp/stamp.jsp?tp=&arnumber=5289166>>, Proceedings of IEEE International Conference on Cluster Computing and Workshops>>, Aug. 31, 2009, 9 pages.
"MAC Authentication Bypass", Retrieved at <<http://www.cisco.com/application/pdf/en/us/guest/netsol/ns171/c649/ccmigration_09186a008087ad6f.pdf>>, Sep. 7, 2012, 30 pages.
"Second Written Opinion Issued in PCT Application No. PCT/US2014/069635", Mailed date: Oct. 29, 2015, 8 Pages.
"International Preliminary Report on Patentability Issued in PCT Application No. PCT/US2014/069635", Mailed Date: Jan. 26, 2016, 9 Pages.

\* cited by examiner

AUTOMATIC STRONG IDENTITY GENERATION FOR CLUSTER NODES

BACKGROUND

Provisioning nodes of a cluster is often tedious and time-consuming. In addition to installing an operating system and applications on each node of the cluster, a cluster administrator may also be involved in configuring security for the nodes of the cluster. Each time a node is replaced or a new node is added, the cluster administrator may be required to re-perform one or more of the steps above. If the process for configuring security is too time-consuming or tedious, the cluster administrator may select a less secure configuration.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to clusters. In aspects, an image is created to install software onto nodes of the cluster. A root secret of the cluster is injected into the image. After installing the software of the image onto a node of the cluster, the node may boot into a secure mode, detect that individualization is needed for the node, create an identity for authenticating with other nodes of the cluster, chain the identity via the root secret, and then securely erase the root secret from the node prior to assuming node duties. Among other things, this allows a single image to be used for installing software on all nodes of a cluster without the compromise of a single node compromising the entire cluster.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program state, program data, other data, and the like.

Headings are for convenience only; information on a given topic may be found outside the section whose heading indicates that topic.

Other definitions, explicit and implicit, may be included below.

Exemplary Operating Environment

Figure 1:
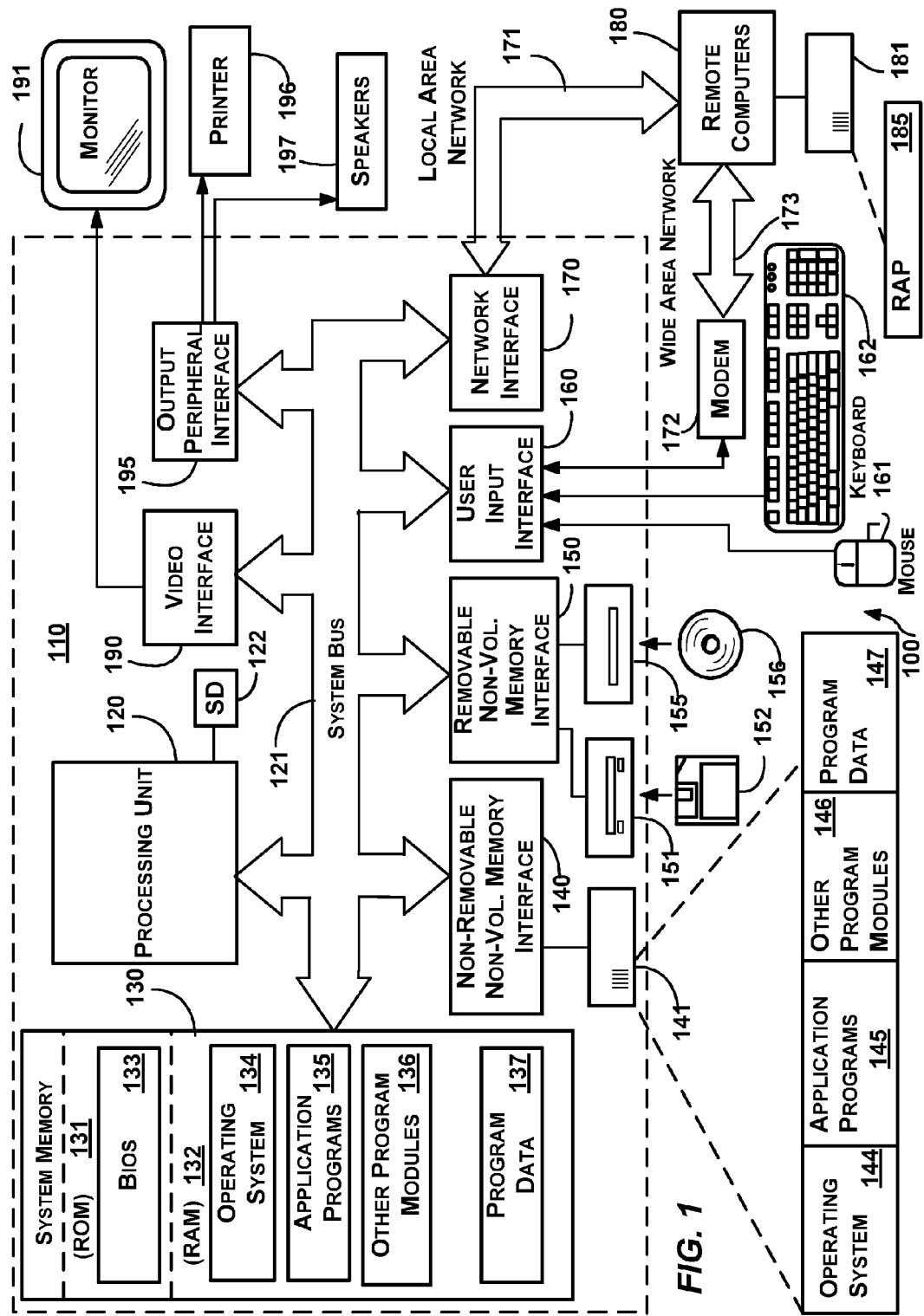
FIG. 1 is a block diagram representing an exemplary computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172, network card, or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Identity Generation

Figure 2:
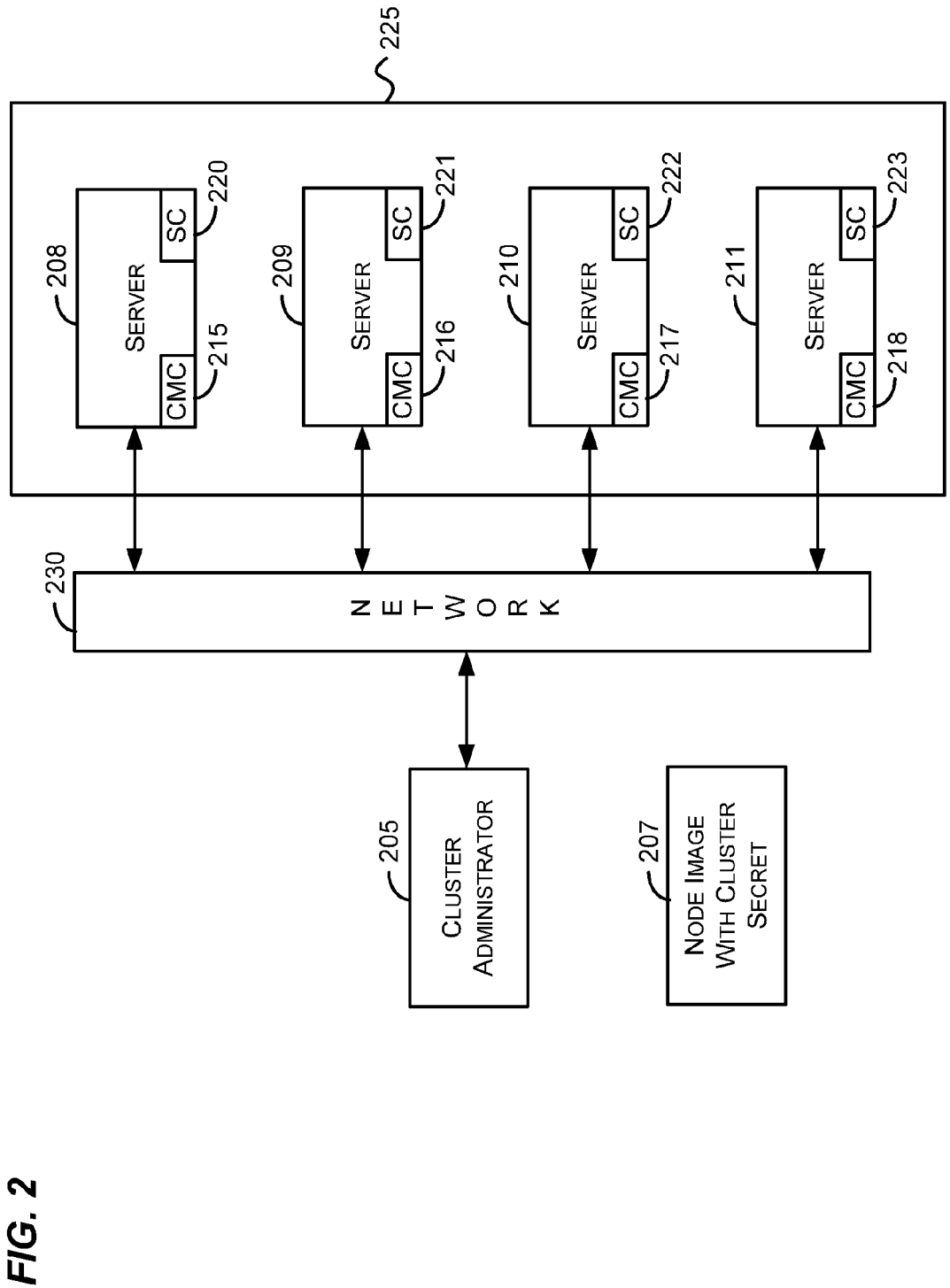
FIG. 2 is a block diagram that generally represents exemplary components of a system configured in accordance with aspects of the subject matter described herein.

As mentioned previously, provisioning nodes of a cluster may be tedious and time consuming. FIG. 2 is a block diagram that generally represents exemplary components of a system configured in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like.

As used herein, the term component may be read in alternate implementations to include hardware such as all or a portion of a device, a collection of one or more software modules or portions thereof, some combination of one or more software modules or portions thereof and one or more devices or portions thereof, or the like. In one implementation, a component may be implemented by structuring (e.g., programming) a processor (e.g., the processing unit 120 of FIG. 1) to perform one or more actions.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, mini-computers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

In one implementation, a component may also include or be represented by code. Code includes instructions that indicate actions a computer is to take. Code may also include data, resources, variables, definitions, relationships, associations, and the like that include information other than actions the computer is to take. For example, the code may include images, Web pages, HTML, XML, other content, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

For simplicity in explanation, some of the actions described below are described in a certain sequence. While the sequence may be followed for some implementations, there is no intention to limit other implementations to the particular sequence. Indeed, in some implementations, the actions described herein may be ordered in different ways and may proceed in parallel with each other.

Turning to FIG. 2, the system 200 may include a cluster administrator 205, a node image 207, a cluster 225, a network 230, and other components (not shown). The cluster 225 may include one or more computers 208-211 (sometimes referred to as servers or nodes). The computers 208-211 may host cluster management components 215-218 (sometimes referred to as a cluster manager), security components 220-223, and other components (not shown).

The various entities (e.g., the cluster administrator 205 and the servers 208-211) may be located relatively close to each other or may be distributed throughout the world. The computers 208-211 of the cluster 225 may, for example, be on the same local area network or may be located in different locations and communicate with each other via one or more networks including the network 230. The various entities may communicate with each other via various networks including intra- and inter-office networks. The cluster administrator 205 may communicate with servers of the cluster 225 via the network 230.

In an embodiment, the network 230 may comprise the Internet. In an embodiment, the network 230 may comprise one or more local area networks, wide area networks, direct connections, virtual connections, private networks, virtual private networks, some combination of the above, and the like.

Some of the description herein describes a secret in the context of certificate-based security protocols. By doing this there is no intention to limit aspects of the subject matter described herein to only those protocols that are based on certificates. For example, a secret (sometimes called the root secret or cluster secret) included in the node image 207 may be used to generate/sign an identity (e.g., a new secret) for a new node that other nodes of the cluster may verify as being created/signed using the secret. This verification may be performed (e.g., via public/private or other cryptographic means) without having access to the secret in the node image 207. Verifying that an identity was created while having access to the secret may be used in an authentication protocol to authenticate a node prior to communicating with the node.

To provision nodes of the cluster 225, a system administrator or the like may create the node image 207. The node image 207 may include all software and configuration settings needed to configure a node to become part of the cluster 225. In addition to the software and configuration settings, the node image 207 may include a secret. The secret may be used to enable authentication between nodes of the cluster 225 as described in more detail below.

For example, in one implementation, the node image 207 may include software and services that are to be hosted by the cluster 225. The software of the node image 207 may include an operating system to install on nodes of the cluster 225. The operating system may support a certificate-based peer-to-peer authentication protocol. For example, the operating system may support mutually-authenticated Transport Layer Security (TLS), Public Key Cryptography User-to-User (PKU2U), another security protocol, or the like.

In one implementation, a cluster secret may be encapsulated in a cluster initialization payload. The cluster initialization payload contains a raw secret. From the raw secret, a private/public key pair may be derived. The private key is used to sign the public key. When communicating with other entities, the node may sign using its signed public key. The raw secret is securely deleted from the node after it is used to sign the public key. This implementation may be used in implementations without digital certificates.

In another implementation, a cluster secret may be used to create symmetric keys using a Lamport signature or the like. In this implementation, a single signature may be made but other parties may verify the signature. In this implementation, the cluster initialization payload may include the cluster key itself and the Lamport public key. Chaining an identity of the node via a root secret available to the node may include signing a representation of a symmetric key with the root secret to create verification data for associating the identity with an identity secret of the node. After the signature, the cluster secret is securely erased but not the Lamport public key.

In one implementation, the cluster secret may be encapsulated in a cluster initialization payload. The cluster initialization payload may include a root certificate to which all members of the cluster chain. A certificate may be implemented as an electronic document that uses a digital signature to bind a public key with an identity. The cluster initialization payload may include both the public and private key material corresponding to the certificate. The node image 207 (which may include the cluster initialization payload) may be used to install software and the cluster initialization payload on each node of the cluster 225.

To add a node to the cluster 225, the system administrator may connect the node image 207 to the node and install the software of the node image 207 on the node. For example, in one implementation, the system administrator may connect a USB or other device that stores the node image 207 to a new node of the cluster and copy the image (including the cluster initialization payload) from the device to the node.

When the node first boots, the node may detect that individualization is needed for the node prior to joining the cluster 225. Individualization refers to the node obtaining an identity with which the node may authenticate with other nodes of the cluster. The node may detect that individualization is needed through various actions, including, for example:

1. Detecting the presence of the cluster secret (e.g., by detecting the cluster initialization payload) in a memory accessible to the node;

2. Detecting the absence of an individualized identity;

3. Detecting the absence of data (e.g., a flag, marker, or the like), that indicates that the node provisioning is complete; and 4. Encountering an instruction indicated by the cluster administrator where the instruction is executed in the first boot of the node.

The above examples are not intended to be all-inclusive or exhaustive. Indeed, based on the teachings herein, those skilled in the art may recognize other conditions that may be used to indicate that individualization is needed that may also be used without departing from the spirit or scope of aspects of the subject matter described herein.

After detecting that individualization is needed, the node may execute an individualization service to generate an identity for the node. The identity may be generated and chained to the cluster secret. For example, in one implementation, the individualization service may generate a new public/private key pair and certificate and chain the certificate to the root certificate using the root private key that is included in the cluster initialization payload. In chaining the certificate to the root certificate, the node may sign the certificate with the root private key. In non-certificate based implementations, the identity may be derived from a secret in the cluster initialization payload as described previously.

Once the new certificate and key pair are generated and chained to the root, the node may securely erase the private key corresponding to the root certificate. Securely erasing refers to deleting the private key from any memory of the node in such a way that it may not be recovered by examining the memory. This ensures that even if the node is compromised that the node may not use the private key to perform further attacks (e.g., to create a new identity that is trusted by the nodes of the cluster). After the node has securely erased the private key corresponding to the root certificate (e.g., by overwriting all copies in any memory available to the node), the node may then safely communicate with other members of the cluster and perform node duties.

To ensure that the node is not compromised while the node still has access to the private key, the node may boot in a secure mode. A secure mode may include, for example, one or more of the following:

1. Other devices attached to the network 230 may not be allowed to communicate with the node. This may be accomplished by physically disconnecting the node from the network 230, from any public or untrusted network, or from all networks, by not installing or executing networking software on the node until the node is initialized (e.g., by refraining from instantiating a network driver on the node while the node has access to the root secret), by disabling networking software on the node, by the node ignoring network traffic, by placing a network firewall between the node and other nodes, by other actions, or the like.

2. The node may be configured to run only trustworthy code and modules. For example, the node may be configured with capabilities to perform a secure boot such as the Universal Extensible Firmware Interface (UEFI) Secure Boot mechanism or the like.

In addition, the node may be provided access to a strong source of entropy in order to generate sufficiently random cryptographic material.

After the node has been initialized and the private key corresponding to the root certificate erased, the node may then begin communicating with other nodes of the cluster 225 as well as servicing requests for services hosted on the cluster 225.

Figure 3:
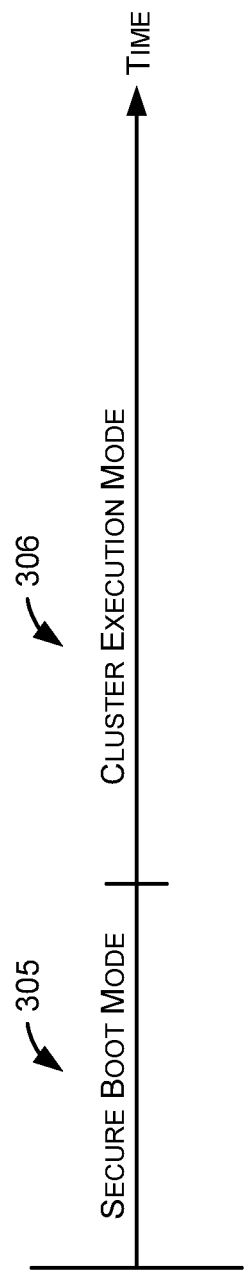
FIG. 3 illustrates a timeline of events that may occur in accordance with aspects of the subject matter described herein.

FIG. 3 illustrates a timeline of events that may occur in accordance with aspects of the subject matter described herein. Prior to the events illustrated in FIG. 3, an image may be installed on a node. After the image has been installed, the node may be booted. Upon initially being booted, in one implementation, the node may enter into a secure boot mode 305. In another implementation, if in booting, the node detects that the private key of the root certificate is available to the node, the node may immediately reboot into a secure mode. In an implementation, code other than the normal operation system (e.g., an UEFI application) may ensure that the node boots in a secure mode when the private key is available to the node.

In one implementation, the node may boot without going into a secure mode and may perform individualization upon initial boot. While this may be less secure than booting in secure mode, the risk may be acceptable in certain implementations.

In the secure boot mode 305, the precautions above may be enforced. After the actions described previously are completed, the node may enter a cluster execution mode 306 where the node communicates with other nodes and may execute code that is not trustworthy. During this time the node is subject to attack and may be compromised.

Returning to FIG. 2, in communicating with other nodes of the cluster 225, the node may use any peer-to-peer authentication protocol. Other nodes do not need to have any prior affiliation with one another, since a node is identified as legitimate because its certificate chains to the shared cluster root.

Furthermore, if a node is compromised by an attacker, the node is incapable of generating a new identity trusted by the cluster because of the elimination of the root certificate private key during individualization. In clusters in which nodes vote on which nodes are misbehaving, this only gives a compromised node one vote (instead of the many votes the node might get if it could generate multiple new identities trusted by the cluster). As a result, a compromised or misbehaving node may be identified and flagged for reimaging by healthy peers (e.g., through the host cluster management components 215-218).

In addition, due to the implicit trust in the cluster root certificate, a freshly imaged device may be introduced into a cluster at any time, individualize itself, and thereafter be recognized as a legitimate member of the cluster.

When a node of the cluster 225 is compromised or begins misbehaving, the cluster management components of the non-compromised nodes may detect a problem and may perform actions to inform the cluster administrator 205. For example, the cluster management components may vote on whether the node is having problems. If a majority of the cluster management components indicate that the node is having problems, the cluster management components on the good-behaving nodes may update data structures to indicate that the misbehaving node is no longer to be trusted.

In addition, a message may be sent to the cluster administrator 205 to inform the cluster administrator 205 of the misbehaving node.

The cluster administrator 205 may inform a system administrator or the like of the misbehaving node. The system administrator may then remove the misbehaving node, install the node image 207 on a new node, and then reboot the new node. Upon rebooting, the new node may detect that it has the root private key and may enter into a secure boot mode in which the new node performs the actions described previously. After completing the actions associated with the secure boot mode, the node may join the cluster 225 and begin performing node duties.

In addition, in joining the cluster 225, the node may request and obtain a list of invalid identities and store the list in a memory of the node. The list may be for denying authentication to nodes that present one or more of the invalid identities while trying to authenticate with the node. The list may be signed with the root private key and distributed to nodes of the cluster 225 to eliminate interference by compromised nodes.

The security components 220-223 may perform various security protocols. For example, the security components 220-223 may perform authentication, establish secure channels, create an identity from the root secret, securely erase the root secret, perform other security protocols, and the like.

Figure 4:
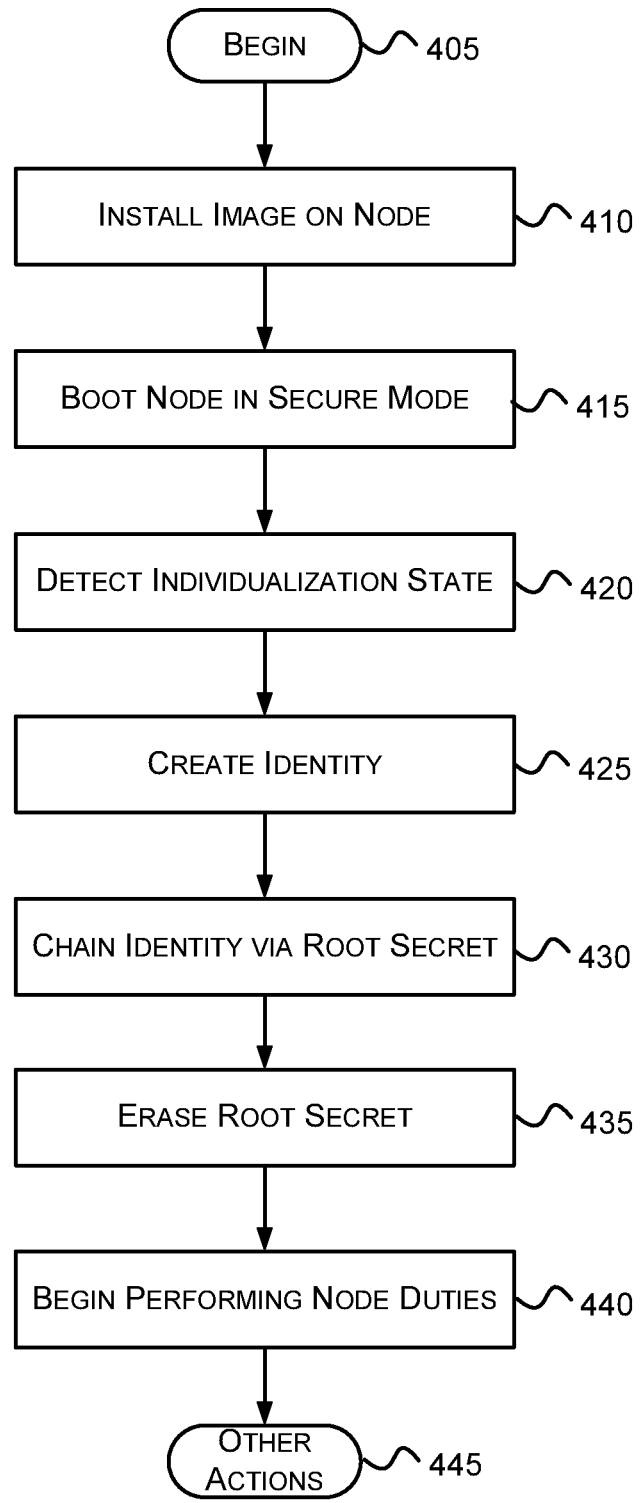
FIGS. 4-5 are flow diagrams that generally represent exemplary actions that may occur in accordance with aspects of the subject matter described herein.
Figure 5:
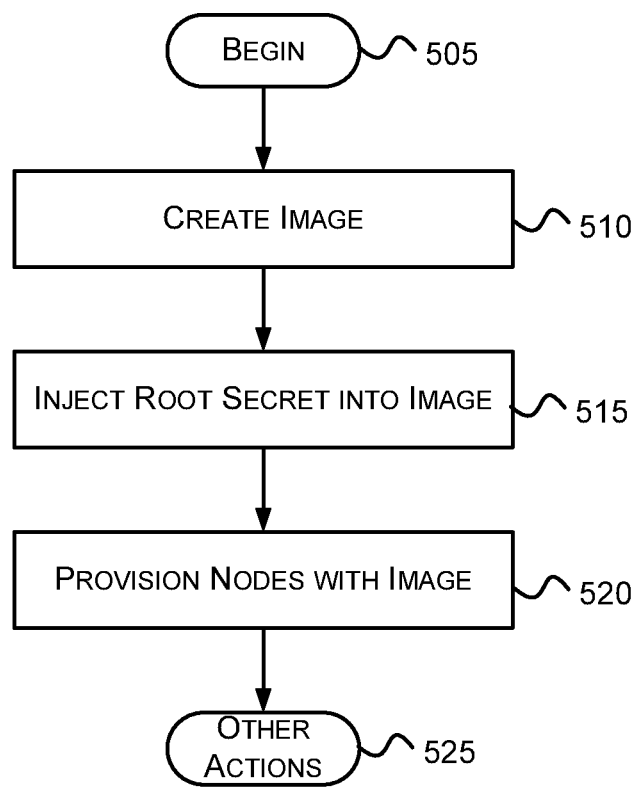

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, an image may be installed on a node. For example, referring to FIG. 2, a system administrator may ensure that the server 208 is not connect to a network and may connect a USB or other device that stores the node image 207 to the server 208. Using the USB or other device, the system administrator may install software and the root secret of the cluster.

The image on the USB or other device need not be customized for each node of the cluster. Indeed, according to aspects of the subject matter described herein, the image may be used without change to install the software and root secret on other nodes of the cluster.

At block 415, a node is boot in a secure mode. For example, referring to FIG. 2, the server 208 may boot in a secure mode as described previously. Booting in a secure mode may involve configuring the node in a mode that does not allow network traffic to affect the operation of the node. This may be done in various ways as previously described.

At block 420, the node may detect that it is in an individualization state. An individualization state is a state in which the node has access to the root secret of a cluster and is expected to create the node's identity, chain the identity via the root secret, and securely erase the root secret from memory of the node. For example, referring to FIG. 2, upon booting, the server 208 may detect that it has access to a root secret of a cluster. The server 208 may detect this by executing boot code that searches for and finds a root secret in a predefined location of a memory of the node. Memory may include nonvolatile memory (e.g., a hard disk or other nonvolatile memory) and/or volatile memory (e.g., RAM or other volatile memory).

At block 425, an identity may be created. For example, referring to FIG. 2, the security component 220 of the server 208 may create a new private key/public key pair and certificate for the server 208. To generate the identity, a function may be executed that uses highly random data to generate an identity secret.

At block 430, the identity may be chained via the root secret. For example, referring to FIG. 2, in one implementation, the security component 220 of the server 208 may perform a cryptographic function that uses the root secret and a secret associated with the identity (e.g., a private key of a key pair) to create verification data such that any of the other nodes of the cluster is enabled using the verification data and knowledge of the root secret to associate the identity created for authenticating with other nodes of the cluster with the identity secret of the node. In one implementation, the cryptographic function is a signing function that uses the root secret to sign data that includes a certificate created at block 425.

At block 435, the root secret is securely erased from the node. This may be done, for example, by overwriting all copies of the root secret in any memory available to the node as described previously.

At block 440, the node may begin performing node duties. For example, referring to FIG. 2, the server 208 may begin servicing client requests and communicating with the other servers 209-211 of the cluster 225 as needed.

At block 445, other actions, if any, may be performed. For example, in joining the cluster, the node may request and obtain a list of invalid identities and store the list in a memory of the node. As mentioned previously, the list may be for denying authentication to nodes that present one or more of the invalid identities while trying to authenticate with the node.

Turning to FIG. 5, at block 505, the actions begin. At block 510, an image is created. For example, referring to FIG. 2, a system administrator (not shown) may create the node image 207. As referenced previously, the image may be created to include, among other things, code that obtains a revocation list from another node of the cluster when the code is executed for the first time on the node. The revocation list may include a list of invalid identities and may be used for denying authentication to nodes that present one or more of the invalid identities while trying to authenticate with the node.

At block 515, a root secret of the cluster is injected into the image. For example, referring to FIG. 2, a system administrator may place a cluster initialization package that includes the root secret in the node image 207. The cluster initialization package may be placed such that it is copied by software used to install the image on the nodes.

At block 520, one or more nodes of the cluster are provisioned with the image. For example, referring to FIG. 2, a system administrator may install software of the image on the nodes of the cluster 225.

At block 525, other actions, if any, may be performed. For example, if the cluster administrator 205 receives a message that indicates that a node is misbehaving, actions including the following may occur:

1. The node may be removed from the cluster;
2. The image may be used to install software and the root secret on a replacement node; and
3. The replacement node may be booted to execute the software.

As another example, if several nodes of the cluster are compromised, a different root secret may be injected into the image and the image may be re-deployed to nodes of the cluster. The different root secret causes a new cluster to be create as the software installed from the image is executed.

As another example, at times it may be desired to update the image. In this case, a new image may be created, a different root secret may be injected into the new image, the new image may be installed on nodes of the cluster, and the nodes may be rebooted to create new identities that are chained via the different root secret.

Returning to FIG. 1, a system implementing aspects of the subject matter described herein is shown in FIG. 1. In particular, memory (e.g., removable or non-removable, volatile or nonvolatile computer storage memory) of the computer 110 may store software obtained from an image (e.g., the node image 207 of FIG. 2). The image includes a root secret for use in creating trust data (e.g., a signature of a certificate created by the computer 110). The trust data allows the computer 110 to establish trust with nodes of a cluster (e.g., the cluster 225 of FIG. 2).

The computer 110 has a processing unit 120 which may include one or more processors that are coupled to the memory via the system bus 121. After powering on the computer 110, the processing unit 120 may be structured (e.g., via software installed in the memory) to perform actions, including:

1. Booting into a secure that does not allow network traffic to affect operations of the one or more processors while in the secure mode;
2. Detecting that the root secret is available in the memory;
3. In response to detecting that the root secret is available in the memory, creating an identity;
4. Chaining the identity via the root secret to create the trust data; and
5. Securely erasing the root secret from the memory.

In addition, the processing unit 120 may be further structured (e.g., programmed) to perform additional actions including:

1. Detecting that a misbehaving node of the cluster is misbehaving and indicating to other nodes of the cluster that the misbehaving node is misbehaving;
2. Updating a data structure stored on the memory to indicate that the misbehaving node is no longer trusted;
3. Utilize a security device (e.g., the hardware security device 122) to validate that only trusted code and modules are executed by the processing unit 120 while in the secure mode; and
4. Any other appropriate actions mentioned herein.

As can be seen from the foregoing detailed description, aspects have been described related to clusters. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method for provisioning a node, the node implemented by a computer having a processor and memory, the method comprising:
    storing, by the computer in the memory, an image configured to install software on nodes of a cluster, the image having a payload encapsulating a root secret of the cluster;
    booting the node in a secure mode;
    detecting that individualization is needed for the node to join the cluster;
    creating an identity of the node using the root secret of the cluster, wherein the identity of the node is configured for authenticating with other nodes of the cluster and is chained to the root secret of the cluster; and
    prior to the node assuming node duties, securely erasing the root secret of the cluster from the memory to ensure that root secret of the cluster is no longer available to the node.

2. The method of claim 1, wherein detecting that individualization is needed comprises detecting absence of an individualized identity for the node.

3. The method of claim 1, wherein detecting that individualization is needed comprises detecting the presence or absence of data that indicates that provisioning of the node is complete.

4. The method of claim 1, wherein detecting that individualization is needed comprises detecting that the root secret is stored in the memory of the computer.

5. The method of claim 1, wherein creating the identity of the node comprises executing a function that uses random data to generate an identity secret for the node that is derived from or signed with the root secret of the cluster.

6. The method of claim 5, wherein creating the identity of the node further comprises performing a cryptographic function that uses the identity secret and the root secret to create verification data such that any of the other nodes of the cluster is enabled using the verification data and knowledge of the root secret to associate the identity of the node with the identity secret for the node.

7. The method of claim 1, wherein creating the identity of the node comprises the node creating a private key/public key pair from random data available to the node and creating a node certificate.

8. The method of claim 7, wherein the identity of the node is chained to the root secret of the cluster by chaining the node certificate to a root certificate associated with the root secret of the cluster.

9. The method of claim 1, wherein creating the identity of the node comprises the node creating a symmetric key and signing a representation of the symmetric key with the root secret to create verification data for associating the identity of the node with an identity secret for the node.

10. The method of claim 1, further comprising installing software on the node using the image, wherein the image is not customized for each node of the cluster.

11. The method of claim 1, further comprising obtaining a list of invalid identities and storing the list in the memory of the computer, the list for denying authentication to nodes that present one or more of the invalid identities while trying to authenticate with the node.

12. A computer storage device having memory storing computer-executable instructions which, when executed by a computer that implements a node, cause the computer to perform actions, comprising:
- storing, in the memory, an image configured to install software on nodes of a cluster, the image having a payload encapsulating a root secret of the cluster; and
- installing software on the node using the image, the software including instructions, when executed a first time on the node, causing the computer to perform additional actions, comprising:
- booting the node in a secure mode,
- detecting that individualization is needed for the node to join the cluster,
- creating an identity of the node using the root secret of the cluster, wherein the identity of the node is configured for authenticating with other nodes of the cluster and is chained to the root secret of the cluster, and
- prior to the node assuming node duties, securely erasing the root secret of the cluster from the memory to ensure that root secret of the cluster is no longer available to the node.

13. The computer storage device of claim 12, the memory further storing computer-executable instructions for:
- receiving a message that indicates that the node is misbehaving, and
- in response to the message, performing actions, comprising:
- removing the node from the cluster, and
- using the image to install the software.

14. The computer storage device of claim 12, wherein the software includes code to obtain a revocation list from another node of the cluster when executed the first time on the node, the revocation list including a list of invalid identities, the revocation list to be used for denying authentication to nodes that present one or more of the invalid identities while trying to authenticate with the node.

15. The computer storage device of claim 12, the memory further storing computer-executable instructions causing the computer to perform actions comprising:
- installing the image having a payload encapsulating a different root secret of the cluster, the different root secret causing a new cluster to be created as software of the image is executed.

16. The computer storage device of claim 15, the memory further storing computer-executable instructions causing the computer to perform actions comprising:
- rebooting the node to create a new identity of the node that is chained to the different root secret.

17. In a computing environment, a system, comprising:
- a memory for storing software obtained from an image, the image configured to install the software on any node of a cluster, the image including a payload encapsulating a root secret of the cluster; and
- one or more processors coupled to the memory, the one or more processors executing the software to perform actions comprising:
- booting a node in a secure mode,
- detecting that individualization is needed for the node to join the cluster,
- in response to detecting that individualization is needed, creating an identity of the node using the root secret of the cluster, wherein the identity of the node is configured for authenticating with other nodes of the cluster and is chained to the root secret of the cluster, and
- prior to the node assuming node duties, securely erasing the root secret from the memory to ensure that root secret of the cluster is no longer available to the node.

18. The system of claim 17, actions further comprising detecting that a misbehaving node of the cluster is misbehaving and indicating to other nodes of the cluster that the misbehaving node is misbehaving.

19. The system of claim 18, the actions further comprising updating a data structure stored on the memory to indicate that the misbehaving node is no longer trusted.

20. The system of claim 17, further comprising a hardware security device coupled to the one or more processors, the one or more processors structured to ensure that the hardware security device is utilized to validate that only trusted code and modules are executed by the one or more processors while in the secure mode.

* * * * *